US009902883B2

(12) United States Patent
Yoon et al.

(10) Patent No.: US 9,902,883 B2
(45) Date of Patent: Feb. 27, 2018

(54) PRESSURE-SENSITIVE ADHESIVE COMPOSITION

(71) Applicant: LG CHEM, LTD., Seoul (KR)

(72) Inventors: Jeong Ae Yoon, Daejeon (KR); No Ma Kim, Daejeon (KR); In Ho Hwang, Daejeon (KR); In Kyu Park, Daejeon (KR); Min Joon Kim, Daejeon (KR); Su Jeong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 646 days.

(21) Appl. No.: 14/535,127

(22) Filed: Nov. 6, 2014

(65) Prior Publication Data

US 2015/0062503 A1 Mar. 5, 2015

Related U.S. Application Data

(63) Continuation of application No. PCT/KR2014/005444, filed on Jun. 19, 2014.

(30) Foreign Application Priority Data

Jun. 19, 2013 (KR) .................. 10-2013-0070516

(51) Int. Cl.
B32B 7/12 (2006.01)
C09J 153/00 (2006.01)
G02B 1/14 (2015.01)
G02B 1/10 (2015.01)
G02B 5/30 (2006.01)
G02F 1/1335 (2006.01)
C09J 7/02 (2006.01)

(52) U.S. Cl.
CPC ......... *C09J 153/005* (2013.01); *C09J 7/0221* (2013.01); *C09J 7/0246* (2013.01); *G02B 1/105* (2013.01); *G02B 1/14* (2015.01); *G02B 5/3033* (2013.01); *G02F 1/133528* (2013.01); *C09J 2203/318* (2013.01); *C09J 2433/00* (2013.01); *C09J 2453/00* (2013.01); *G02B 5/3025* (2013.01); *G02F 2202/28* (2013.01); *Y10T 428/2852* (2015.01)

(58) Field of Classification Search
None
See application file for complete search history.

(56) References Cited

U.S. PATENT DOCUMENTS

| | | | | | |
|---|---|---|---|---|---|
| 5,266,402 | A | * | 11/1993 | Delgado | C09J 7/0217 428/355 AK |
| 2006/0024521 | A1 | * | 2/2006 | Everaerts | B32B 7/06 428/522 |
| 2009/0275705 | A1 | * | 11/2009 | Fujita | C08F 293/00 525/342 |
| 2012/0274881 | A1 | | 11/2012 | Jang et al. | |
| 2012/0314160 | A1 | * | 12/2012 | Hwang | G02B 5/305 349/96 |
| 2013/0079468 | A1 | | 3/2013 | Kanemura et al. | |

FOREIGN PATENT DOCUMENTS

| | | | |
|---|---|---|---|
| CN | 102307964 A | | 1/2012 |
| EP | 2366750 A1 | | 9/2011 |
| JP | 0782542 A | | 3/1995 |
| JP | 2004058289 A | | 2/2004 |
| JP | 2006-282687 A | | 10/2006 |
| JP | 2008-291071 A | | 12/2008 |
| JP | 2012-237965 A | | 12/2012 |
| JP | 2013-520705 A | | 6/2013 |
| KR | 10-2002-0010693 A | | 2/2002 |
| KR | 10-2005-0076706 A | | 7/2005 |
| KR | 10-2009-0077652 A | | 7/2009 |
| KR | 10-2011-0002857 A | | 1/2011 |
| TW | 200948916 A1 | | 12/2009 |
| TW | 201202385 A1 | | 1/2012 |
| WO | 2009/061673 A2 | | 5/2009 |
| WO | 2009/131321 A2 | | 10/2009 |
| WO | WO 2011105874 A2 * | | 9/2011 ............ G02B 5/305 |
| WO | 2011/152514 A1 | | 12/2011 |
| WO | 2012/132115 A1 | | 10/2012 |

OTHER PUBLICATIONS

"Interpenetrating Polymer Networks", Encyclopedia of Polymer Science and Technology, vol. 10, pp. 272-311, published online Mar. 15, 2004.*

* cited by examiner

Primary Examiner — Anish P Desai
(74) Attorney, Agent, or Firm — Dentons US LLP

(57) ABSTRACT

Provided is a pressure-sensitive adhesive composition. The pressure-sensitive adhesive composition may form a pressure-sensitive adhesive having a fine phase separation structure by a block copolymer including a hard segment and a soft segment, and also has a high elastic modulus and an excellent pressure-sensitive adhesive property. For example, although applied to a thin polarizing plate on at least one surface of which a polarizer protective film is not used, the pressure-sensitive adhesive may allow the polarizing plate to exhibit excellent durability, moisture resistance, workability, a pressure-sensitive adhesive property and a light leakage inhibiting ability.

16 Claims, 1 Drawing Sheet

--PRIOR ART--

PRESSURE-SENSITIVE ADHESIVE COMPOSITION

This application is a bypass continuation of International Application No. PCT/KR2014/005444 filed Jun. 19, 2014, which claims priority to Korean Patent Application No. 10-2013-0070516 filed Jun. 19, 2013, both of which are incorporated herein by reference.

TECHNICAL FIELD

The present application relates to a pressure-sensitive adhesive composition, a polarizer, and a display device.

BACKGROUND

A liquid crystal display (LCD) may include a liquid crystal panel including liquid crystals present between transparent substrates; and polarizing plates adhered to both sides of the liquid crystal panel.

A polarizing plate has a structure as shown in FIG. 1. That is, a polarizing plate 100 may include a polarizer 101 having a polarization function; and polarizer protective films 1021 and 1022, which are adhered to both surfaces of the polarizer 101, respectively. The polarizing plate 100 may include a pressure-sensitive adhesive layer 103, which is formed under the protective film 1022 to be used for adhering to a liquid crystal panel, and a releasing film 104 formed under the pressure-sensitive adhesive layer 103. In addition, not shown in FIG. 1, the polarizing plate may include an additional functional film such as an antireflection film or a compensation film.

In such a conventional structure of the polarizing plate, to provide a device having a smaller thickness and a light weight, for example, as shown in patent document 1, there is an attempt to omit one of the protective films 1021 and 1022 formed on both surfaces of a polarizer 101. However, it is not easy to provide a polarizing plate satisfying a desired performance without a protective film.

PRIOR ART DOCUMENT

Patent Document

PATENT DOCUMENT 1: Japanese Laid-Open Patent Application No. 2002-014226

DESCRIPTION

Technical Object

The present application provides a pressure-sensitive adhesive composition, a polarizing plate, and a display device.

Technical Solution

In one aspect, the present application provides pressure-sensitive adhesive composition, which may include a block copolymer and a multifunctional crosslinking agent. The term "block copolymer" may refer to a copolymer including blocks of different polymerized monomers.

The pressure-sensitive adhesive composition may include an interpenetrating polymer network (hereinafter, referred to as "IPN") after curing, that is, in a cured state. The term "curing", for example, may mean a process of chemically reacting at least two components included in a pressure-sensitive adhesive composition by irradiating electromagnetic waves and/or heating. The term "electromagnetic waves" used herein may include microwaves, infrared (IR) rays, ultraviolet (UV) rays, X rays, y rays, or particle beams such as a particle beams, proton beams, neutron beams and electron beams.

The term "IPN" may refer to a state in which at least two crosslinking structures are simultaneously included. In one embodiment, the at least two crosslinking structures may not be linked by a chemical bond. For example, when the pressure-sensitive adhesive composition includes a component that can implement a crosslinking structure through a crosslinking or polymerizing reaction, separate from a crosslinking reaction of a multifunctional crosslinking agent with the block copolymer, an IPN may be implemented. In one embodiment, the at least two crosslinking structures included in IPN may be present in a penetrated or entangled state, or in a linked state by a physical bond.

In one embodiment, the block copolymer may include a first block having a glass transition temperature of 50° C. and a second block having a glass transition temperature of −30° C. The term "glass transition temperature of a block" of a block copolymer may mean a glass transition temperature measured from a polymer formed only of monomers included in the block. In one embodiment, a glass transition temperature of the first block may be 30° C. or more, 50° C. or more, 60° C. or more, 70° C. or more, 80° C. or more, 90° C. or more, or 100° C. or more. In addition, the upper limit of the glass transition temperature of the first block may be approximately, but is not particularly limited to, for example, 200° C. or more or 150° C. or more. In addition, a glass transition temperature of the second block may be 0° C. or more, −10° C. or more, −20° C. or more, −30° C. or more, or −35° C. or more. In addition, the lower limit of the glass transition temperature of the second block may be approximately, but is not particularly limited to, for example, −100° C. or more, −90° C. or more, −80° C. or more, −70° C. or more, −60° C. or more, or −50° C. or more. Such a block copolymer including two types of blocks may have a hard domain and a soft domain, which are micro phase-separated, on a pressure-sensitive adhesive after curing, and may exhibit a high elastic modulus and an excellent pressure-sensitive adhesive property.

The block copolymer may have a number average molecular weight (MO of approximately 20,000 to 500,000. The number average molecular weight may be measured using, for example, gel permeation chromatography (GPC). The block copolymer may also have a molecular weight distribution ($M_w/M_n$), that is, a ratio ($M_w/M_n$) of a weight average molecular weight ($M_w$) to a number average molecular weight (MO of 1.0 to 3.5. As the molecular weight is maintained as described above, for example, even in a state in which a pressure-sensitive adhesive has a high elastic modulus, an excellent pressure-sensitive adhesive property may be ensured.

In one embodiment, the block copolymer may be a crosslinkable copolymer having a crosslinkable functional group. As the crosslinkable functional group, a hydroxyl group, a carboxyl group, an isocyanate group or a glycidyl group, for example, a hydroxyl group, may be used.

The crosslinkable functional group may be, for example, included in a second block having a low glass transition temperature. In one embodiment, in the block copolymer, a crosslinkable functional group may not be included in the first block having a high glass transition temperature, but in the second block. However, when needed, a crosslinkable functional group may also be present in the first block.

In the block copolymer, types of monomers forming the first block and the second block are not particularly limited as long as the glass transition temperature is ensured by a combination of each monomer.

In one embodiment, the first block may include a methacrylic acid ester monomer. The monomer may be included in, for example, the first block as a polymerization unit. In the specification, the sentence "the monomer is included in a polymer or block as a polymerization unit" may mean that the monomer forms a backbone, for example, a main chain or a side chain, of its polymer or a block through polymerization. The methacrylic acid ester monomer may be, for example, an alkyl methacrylate. In one embodiment, in consideration of controlling a cohesive strength, a glass transition temperature, and a pressure-sensitive adhesive property, an alkyl methacrylate having an alkyl group having 1 to 12 carbon atoms may be used. Such a monomer may be methyl methacrylate, ethyl methacrylate, n-propyl methacrylate, isopropyl methacrylate, n-butyl methacrylate, t-butyl methacrylate, sec-butyl methacrylate, pentyl methacrylate, 2-ethylhexyl methacrylate, 2-ethylbutyl methacrylate, n-octyl methacrylate, isobornyl methacrylate, isooctyl methacrylate, isononyl methacrylate, or lauryl methacrylate, which may be used alone or in combination of at least two thereof to ensure the glass transition temperature.

The second block may include, for example, an acrylic ester monomer. The monomer may also be included in the second block as a polymerization unit. As the acrylic ester monomer, for example, an alkyl acrylate may be used, and preferably, in consideration of controlling a cohesive strength, a glass transition temperature, and a pressure-sensitive adhesive property, an alkyl acrylate having an alkyl group having 1 to 12 carbon atoms may be used. Such a monomer may be methyl acrylate, ethyl acrylate, n-propyl acrylate, isopropyl acrylate, n-butyl acrylate, t-butyl acrylate, sec-butyl acrylate, pentyl acrylate, 2-ethylhexyl acrylate, 2-ethylbutyl acrylate, n-octyl acrylate, isobornyl acrylate, isooctyl acrylate, isononyl acrylate or lauryl acrylate, which may be used alone or in combination of at least two thereof to ensure the glass transition temperature.

The second block may further include, for example, a copolymerizable monomer having a crosslinkable functional group as a polymerization unit. For example, the second block may include 60 to 98.5 parts by weight of an acrylic ester monomer and 1.5 to 40 parts by weight of a copolymerizable monomer having a crosslinkable functional group. The unit "parts by weight" used herein may refer to, for example, a weight ratio between components.

As a copolymerizable monomer having a crosslinkable functional group, for example, a monomer having a part copolymerized with another monomer included in a block copolymer such as an acrylic ester monomer, and a crosslinkable functional group such as a hydroxyl group may be used. In the field of preparing a pressure-sensitive adhesive, various copolymerizable monomers having a crosslinkable functional group are known, and such a monomer may be suitably selected and included in the polymer. For example, the copolymerizable monomer having a hydroxyl group may be, but is not limited to, a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or a hydroxyalkyleneglycol (meth)acrylate such as 2-hydroxyethyleneglycol (meth)acrylate or 2-hydroxypropyleneglycol (meth)acrylate.

The monomers included in the first and second blocks are not limited thereto. For example, when needed, the first block may also include an acrylic ester monomer and/or a copolymerizable monomer having a crosslinkable functional group, and the second block may also include a methacrylic acid ester monomer. In addition, the first and/or second block(s) may include another optional comonomer as a polymerization unit, in addition to the above-described monomer. The comonomer may be, but is not limited to, a nitrogen-containing monomer such as (meth)acrylonitrile, (meth)acrylamide, N-methyl (meth)acrylamide, N-butoxy methyl (meth)acrylamide, N-vinyl pyrrolidone or N-vinyl caprolactam; an alkylene oxide-containing monomer such as alkoxy alkylene glycol (meth)acrylic ester, alkoxy dialkylene glycol (meth)acrylic ester, alkoxy trialkylene glycol (meth)acrylic ester, alkoxy tetraalkylene glycol (meth)acrylic ester, alkoxy polyethyleneglycol (meth)acrylic ester, phenoxy alkylene glycol (meth)acrylic ester, phenoxy dialkylene glycol (meth)acrylic ester, phenoxy trialkylene glycol (meth)acrylic ester, phenoxy tetraalkylene glycol (meth)acrylic ester or phenoxy polyalkylene glycol (meth)acrylic ester; a styrene-based monomer such as styrene or methyl styrene; a glycidyl-containing monomer such as glycidyl (meth)acrylate; or a carboxyl acid vinyl ester such as vinyl acetate. A least one or two or more suitable types of such comonomers may be included in a polymer. Such a comonomer may be included in a block copolymer in a ratio of, for example, 20 parts by weight or less, or 0.1 to 15 parts by weight with respect to a weight of another monomer in each block.

The block copolymer may be formed in various types as long as the first and second blocks are included, and when needed, may include a third block in addition to the first and second blocks. In one embodiment, as the block copolymer, a diblock copolymer sequentially including the first and second blocks such as a copolymer in which a first block A and a second block B are included in a A-B type, or a triblock copolymer in which the first block, the second block, and the first block are sequentially included such as a copolymer in which a first block A and a second block B are included in a A-B-A type, or a mixture of the diblock copolymer and the triblock copolymer may be used.

A weight ratio of the first block A and the second block B included in the block copolymer is not particularly limited, and for example, the second block may be included at approximately 25 to 1900 parts by weight relative to 100 parts by weight of the first block. In another embodiment, the second block may be included in the block copolymer at 50 parts by weight or more, 100 parts by weight or more, or 150 parts by weight or more. In addition, in another embodiment, the second block may be included in the block copolymer at 1800 parts by weight or less, 1700 parts by weight or less, 1600 parts by weight or less, 1500 parts by weight or less, 1400 parts by weight or less, 1300 parts by weight or less, 1200 parts by weight or less, 1100 parts by weight or less, 1000 parts by weight or less, 900 parts by weight or less, 800 parts by weight or less, 700 parts by weight or less, 600 parts by weight or less, or 500 parts by weight or less. In such a range, soft and hard domains are suitably formed in a pressure-sensitive adhesive, which simultaneously exhibits a high elastic modulus and an excellent pressure-sensitive adhesive property, and therefore can particularly be preferable in a polarizing plate having a thin structure that will be described below.

The block copolymer may be prepared by a conventional method. For example, the block copolymer may be prepared by forming first or second blocks by only polymerizing monomers for forming the first or second block, and polymerizing a monomer forming the second or first block from a reactive end of the first or second block. The polymerization may be performed by, for example, solution polymerization, photo polymerization, bulk polymerization, suspension polymerization, or emulsion polymerization.

The pressure-sensitive adhesive composition may include a multifunctional crosslinking agent, and the crosslinking agent may have a crosslinking structure through a reaction of the block copolymer, for example, a crosslinkable functional group of the copolymer. As the multifunctional crosslinking agent, for example, a crosslinking agent that can induce a crosslinking reaction due to application of heat, an isocyanate crosslinking agent, an epoxy crosslinking agent, an aziridine crosslinking agent or a metal chelate crosslinking agent, for example, an isocyanate crosslinking agent may be used.

As the isocyanate crosslinking agent, for example, a diisocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound prepared by reacting the diisocyanate compound with a polyol may be used. Here, the polyol may be, for example, trimethylol propane.

For the pressure-sensitive adhesive composition, at least one crosslinking agents may be used, but the crosslinking agent is not limited thereto.

The multifunctional crosslinking agent may be included in the pressure-sensitive adhesive composition at 0.01 to 10 parts by weight or 0.01 to 5 parts by weight relative to 100 parts by weight of the block copolymer. In such a range, a suitable crosslinking structure may be realized according to a purpose.

The pressure-sensitive adhesive composition may further include a multifunctional acrylate. The multifunctional acrylate may be selected not to participate in the crosslinking reaction between the block copolymer and the multifunctional crosslinking agent, and realize a crosslinking structure through a separate polymerization reaction, and therefore the IPN may be realized in the pressure-sensitive adhesive. Such a multifunctional acrylate may serve to increase an elastic modulus, for example, by forming a hard domain in the pressure-sensitive adhesive through the polymerization reaction.

For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxyl)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane (meth)acrylate (e.g. a reaction product of an isocyanate monomer and trimethylolpropane tri(meth)acrylate). In addition, as the multifunctional acrylate, a compound referred to as a photocurable oligomer, urethane acrylate, epoxy acrylate, polyester acrylate or polyether acrylate may be used. Among the above-described compositions, one or at least two suitable types may be selected and used.

As the multifunctional acrylate, for example, a compound having at least two or three acryl groups or methacryl groups, and a molecular weight of 10,000 g/mol or less, or less than 10,000 g/mol may be used. In addition, the multifunctional acrylate may be, for example, an acrylate including a cyclic structure and/or a urethane bond. Here, the cyclic structure included in the acrylate may be any one of a carbocyclic or heterocyclic structure; or a monocyclic or polycyclic structure. As the ring structure, a ring-type cycloalkyl structure having 3 to 12 or 3 to 8 carbon atoms such as cyclopentane, cyclohexane, or cycloheptane may be used, and the acrylate may include at least one, 1 to 5 or 1 to 3 ring structures, and at least one heteroatom such as O, S, or N. A selection of such an acrylate may be advantageous in controlling an elastic modulus or durability of the pressure-sensitive adhesive.

The multifunctional acrylate may be included at, for example, 5 to 300 parts by weight relative to 100 parts by weight of the block copolymer. The ratio may be changed in consideration of, for example, a desired elastic modulus or pressure-sensitive adhesive property.

The pressure-sensitive adhesive composition may further include a radical initiator for a polymerization reaction of the multifunctional acrylate. As the radical initiator, a radical thermal initiator and/or a radical photoinitiator may be used.

As the thermal initiator, for example, one or at least two of an azo-based initiator such as 2,2-azobis-2,4-dimethylvaleronitrile (V-65, Wako), 2,2-azobis isobutyronitrile (V-60, Wako) or 2,2-azobis-2-methylbutyronitrile (V-59, Wako); a peroxyester compound such as dipropyl peroxydicarbonate (Peroyl NPP, NOF), diisopropyl peroxydicarbonate (Peroyl IPP, NOF), bis-4-butylcyclohexyl peroxydicarbonate (Peroyl TCP, NOF), diethoxyethyl peroxydicarbonate (Peroyl EEP, NOF), diethoxyhexyl peroxydicarbonate (Peroyl OPP, NOF), hexyl peroxydicarbonate (Perhexyl ND, NOF), dimethoxybutyl peroxydicarbonate (Peroyl MBP, NOF), bis(3-methoxy-3-methoxybutyl) peroxydicarbonate (Peroyl SOP, NOF), hexyl peroxy pivalate (Perhexyl PV, NOF), amyl peroxy pivalate (Luperox 546M75, Atofina), butyl peroxy pivalate (Perbutyl, NOF) or trimethylhexanoyl peroxide (Peroyl 355, NOF); a peroxydicarbonate compound such as dimethyl hydroxybutyl peroxaneodecanoate (Luperox 610M75, Atofina), amyl peroxy neodecanoate (Luperox 546M75, Atofina) or butyl peroxy neodecanoate (Luperox 10M75, Atofina); an acyl peroxide such as 3,5,5-trimethylhexanoyl peroxide, lauryl peroxide or dibenzoyl peroxide; a ketone peroxide; a dialkyl peroxide; a peroxy ketal; or a peroxide initiator such as hydroperoxide may be used, and as the photoinitiator, a benzoin-, hydroxy ketone-, aminoketone- or phosphine oxide-based photoinitiator and specifically, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-lone, 1-hydroxycyclohexylphenylketone, 2-methyl-1-[4-(methylthio)phenyl]-

2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methyl thioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], or 2,4,6-trimethylbenzoyl-diphenyl-phosphineoxide may be used, but the present application is not limited thereto.

The radical initiator may be included at 0.01 to 20 parts by weight or 0.01 to 10 parts by weight relative to 100 parts by weight of the block copolymer. The ratio may be changed in consideration of an efficiency of a polymerization reaction of the multifunctional acrylate or a ratio of a remaining initiator after curing.

The pressure-sensitive adhesive composition may further include a silane coupling agent. The silane coupling agent may be, for example, a silane coupling agent having a beta-cyano group or an acetocetyl group. Such a silane coupling agent may allow a pressure-sensitive adhesive to exhibit, for example, excellent cohesion and adhesion stability, and to excellently maintain durability and reliability under a heat and humidity resistant condition.

As a silane coupling agent having a beta-cyano group or an acetoacetyl group, for example, a compound represented by Formula 1 or 2 may be used.

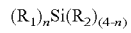
[Formula 1]

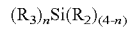
[Formula 2]

In Formula 1 or 2, $R_1$ is a beta-cyanoacetyl group or a beta-cyanoacetylalkyl group, $R_3$ is an acetoacetyl group or an acetoacetylalkyl group, $R_2$ is an alkoxy group, and n is a number of 1 to 3.

In Formula 1 or 2, the alkyl group may have 1 to 20, 1 to 16, 1 to 12, 1 to 8, or 1 to 4 carbon atoms, such an alkyl group may be a linear, branched, or cyclic type, and may be substituted by at least one substituent when needed.

In addition, in Formula 1 or 2, the alkoxy group may have 1 to 20, 1 to 16, 1 to 12, 1 to 8, or 1 to 4 carbon atoms, and such an alkoxy group may be a linear, branched, or cyclic type, and may be substituted by at least one substituent when needed.

In addition, in Formula 1 or 2, n may be, for example, a number of 1 to 3, 1 to 2, or 1.

The compound of Formula 1 or 2 may be, but is not limited to, for example, acetoacetylpropyl trimethoxy silane, acetoacetylpropyl triethoxy silane, beta-cyanoacetylpropyl trimethoxy silane, or beta-cyanoacetylpropyl triethoxy silane.

In the pressure-sensitive adhesive composition, the silane coupling agent may be included at 0.01 to 5 parts by weight or 0.01 to 1 parts by weight relative to 100 parts by weight of the block copolymer. Within this range, desired physical properties may be effectively provided to the pressure-sensitive adhesive.

The pressure-sensitive adhesive composition may further include a tackifier when needed. The tackifier may be, but is not limited to, for example, one or a mixture of at least two of a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin. The tackifier may be included in the pressure-sensitive adhesive composition at 100 parts by weight or less relative to 100 parts by weight of the block copolymer.

The pressure-sensitive adhesive composition may also include at least one additive selected from the group consisting of an epoxy resin, a curing agent, a UV stabilizer, an antioxidant, a coloring agent, a reinforcing agent, a filler, a foaming agent, a surfactant, and a plasticizer when needed.

The pressure-sensitive adhesive composition may exhibit a tensile modulus of 0.5 to 1,000 MPa at 25° C. after curing, that is, in a state in which IPN is included. The tensile modulus may be in the range of, for example, 1 to 700 MPa or 10 to 500 MPa. In such a range, the pressure-sensitive adhesive may exhibit, for example, an excellent effect when applied to the optical film.

The pressure-sensitive adhesive composition may be, for example, a pressure-sensitive adhesive composition for the optical film. The pressure-sensitive adhesive composition for the optical film may be used, for example, to laminate an optical film such as a polarizer, a polarizer protective film, a retardation film, an antiglare film, a wide viewing angle compensating film or a brightness enhancing film, or to adhere the optical film or a stacked structure thereof to an adherend such as a liquid crystal panel. In one embodiment, the pressure-sensitive adhesive composition may be a pressure-sensitive adhesive composition for a polarizing plate, which forms a pressure-sensitive adhesive used to adhere a polarizing plate including a polarizer to a liquid crystal panel.

In another aspect, the present application provides a polarizing plate. The illustrative polarizing plate may include a polarizer, and a pressure-sensitive adhesive layer formed on one surface of the polarizer. The pressure-sensitive adhesive layer may include, for example, the above-described pressure-sensitive adhesive composition. The pressure-sensitive adhesive layer may include, for example, the pressure-sensitive adhesive composition including an IPN structure. The pressure-sensitive adhesive layer may be, for example, a pressure-sensitive adhesive layer to adhere a polarizing plate to a liquid crystal panel. Such a pressure-sensitive adhesive layer may be formed by, for example, curing the pressure-sensitive adhesive composition. The curing may be performed by applying suitable heat or electromagnetic waves to induce a process of maintaining a composition for suitable time at a suitable temperature in which a crosslinking reaction between a block copolymer and a multifunctional crosslinking agent is caused in the pressure-sensitive adhesive composition, and a polymerization reaction of a multifunctional acrylate when needed.

As the polarizer included in the polarizing plate, for example, a generally known polarizing film such as a polyvinyl alcohol polarizer may be used.

The polarizer is a functional film or sheet which can extract light oscillating in only one direction from incident light with oscillations in various directions. Since such a polarizer is generally manufactured of a hydrophilic resin such as polyvinyl alcohol, it is vulnerable to moisture. The polarizer may be usually manufactured through a drawing process, thereby easily contracting under a humid condition, and reducing an optical characteristic. Accordingly, a polarizer protective film is generally adhered to both surfaces of the polarizer.

Therefore, the polarizing plate may also include the polarizer protective film adhered to both surfaces of the polarizer. In addition, in another embodiment, a polarizer protective film may be further included on only one surface of the polarizing plate. In such a case, the pressure-sensitive adhesive layer may be adhered to a surface of the polarizer not having the protective film.

FIG. 2 shows a structure of an illustrative polarizing plate 200. As shown in FIG. 2, the polarizing plate 200 may include a polarizer 101, and a pressure-sensitive adhesive layer 201 formed on one surface of the polarizer 101, and a protective film 1021 is adhered to a surface of the polarizer 101 not having the pressure-sensitive adhesive layer 201. In some cases, in the polarizing plate, adhering of the protective film may be omitted on both surfaces of the polarizer.

When any one of the protective films formed on both surfaces of the polarizer is removed in the structure of the polarizing plate, durability and optical properties may be reduced due to poor dimensional stability of the polarizer, and moisture resistance may also considerably reduced.

However, since the pressure-sensitive adhesive layer exhibits a high elastic modulus, and an excellent pressure-sensitive adhesive property, when the pressure-sensitive adhesive layer is adhered to a surface not having the protective film of the polarizer directly or via an adhesive layer which will be described below, it serves as the protective film of the polarizer and is adhered to the polarizing plate with high durability. Accordingly, a thinner and lighter polarizing plate may be provided. A polarizing plate having a structure in which at least one of the protective films formed on both surfaces of the polarizer is removed may refer to a thin polarizing plate in the present application.

In one embodiment, the pressure-sensitive adhesive layer may be adhered to a polarizer via an adhesive layer. In one embodiment, the polarizing plate may further include an adhesive layer directly adhered to one surface of the polarizer, for example, a surface to which a protective film is not adhered, and the pressure-sensitive adhesive layer may be directly adhered to the adhesive layer. The term "B directly adhered to A" used herein means the case in which another layer is present between A and B.

The adhesive layer may be, for example, one or at least two of a polyvinyl alcohol-based adhesive; an acrylic adhesive; a vinyl acetate-based adhesive; an urethane-based adhesive; a polyester-based adhesive; a polyolefin-based adhesive; a polyvinylalkylether-based adhesive; a rubber-based adhesive; a vinyl chloride-vinylacetate-based adhesive; a styrene-butadiene-styrene (SBS) adhesive; a hydrogenated styrene-butadiene-styrene (SEBS)-based adhesive; an ethylene-based adhesive; and an acrylic ester-based adhesive. The adhesive layer may be formed using, for example, a water-, solvent- or non-solvent-based adhesive composition. In addition, the adhesive composition may be a thermocurable, room temperature curable, moisture curable or photocurable adhesive composition, and in one embodiment, the adhesive layer may be formed using a photocurable, for example, a UV-curable adhesive composition, but the present application is not limited thereto.

A method of forming an adhesive layer on a polarizer may include, but is not particularly limited to, for example, coating an adhesive composition on a polarizer, laminating a pressure-sensitive adhesive layer, and curing the coated adhesive composition.

A type of the polarizer protective film adhered to the polarizer is not particularly limited, and a known protective film may be used. For example, a cellulose-based film such as a TAC film, a polyester-based film such as a poly(ethylene terephthalate)) (PET) film, a polycarbonate-based film, a polyestersulfone-based film, or a polyolefin-based film such as an acryl-based and/or a polyethylene film, a polypropylene film, a cyclic polyolefin film or polyolefin film having a norbornene structure or an ethylene-propylene copolymer film may be used, but the present application is not limited thereto. The protective film may be adhered to the polarizer via, for example, the above-described adhesive layer. The protective film may also be a resin layer cured to a hard state.

The polarizing plate may further include a releasing film adhered under the pressure-sensitive adhesive layer. As the releasing film, a conventional component known in the art may be employed.

The polarizing plate may further include at least one functional layer selected from the group consisting of an anti-reflection layer, an anti-glare layer, a retardation plate, a wide viewing angle compensation film, and a brightness enhancing film when necessary.

In still another aspect, the present application provides a display device, for example, a liquid crystal display (LCD). The display device, for example, the LCD, may include a liquid crystal panel on one or both surface of which the polarizing plates are adhered.

A type of the liquid crystal panel is not particularly limited. For example, as the liquid crystal panel, a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel, or a vertically-aligned (VA) panel may be used without limitation.

In addition, other components constituting the display device, for example, the LCD, (e.g., a color filter substrate or an array substrate), are not particularly limited either, and any one of the components known in the art may be employed without limitation.

Effect

A pressure-sensitive adhesive composition of the present application can form a pressure-sensitive adhesive having a fine phase separation structure by a block copolymer including a hard segment and a soft segment, and also having a high elastic modulus and an excellent pressure-sensitive adhesive property. For example, although applied to a thin polarizing plate on at least one surface of which a polarizer protective film is not used, the pressure-sensitive adhesive can allow the polarizing plate to exhibit excellent durability, moisture resistance, workability, a pressure-sensitive adhesive property and a light leakage inhibiting ability.

ILLUSTRATIVE EMBODIMENTS

Figure 1:
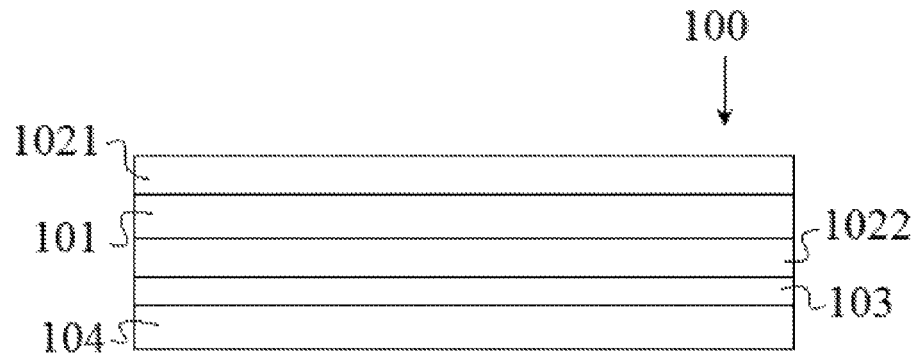
FIG. 1 shows an illustrative embodiment of a structure of a general polarizing plate.
Figure 2:
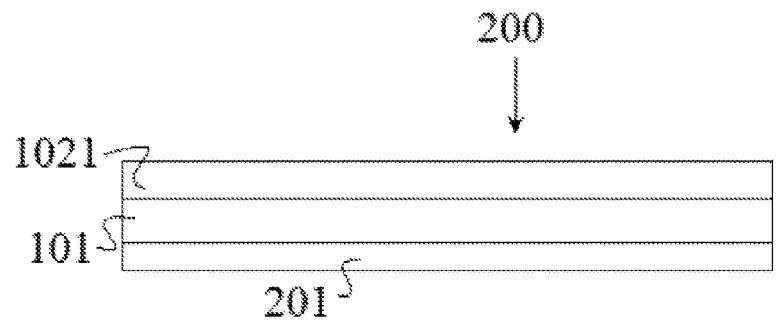
FIGS. 2 and 3 show illustrative embodiments of structures of different illustrative polarizing plates.
Figure 3:
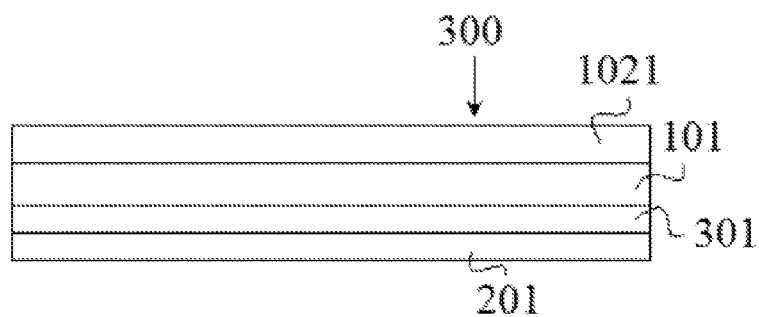

Hereinafter, a pressure-sensitive adhesive composition will be described in detail with reference to examples and comparative examples, but the scope of the pressure-sensitive adhesive composition is not limited to examples.

1. Evaluation of Molecular Weight

A number average molecular weight (Mn) and a molecular weight distribution (PDI) were measured using GPC under the following conditions. To draw a calibration curve, standard polystyrene of an Agilent system was used, and measurement results were converted.

<Measurement Conditions>
Measuring Tool: Agilent GPC (Agilent 1200 series, U.S.)
Column: two connected PLgel mixed B
Column Temperature: 40° C.
Eluent: Tetrahydrofuran (THF)
Flow Rate: 1.0 mL/min
Concentration: ~1 mg/mL (100 μL injection)
2. Calculation of glass transition temperature
A glass transition temperature (Tg) of each block of a block copolymer was measured by the following formula:

$$1/Tg = \Sigma Wn/Tn \qquad \text{<Formula>}$$

In this formula, Wn is a weight fraction of a monomer used in each block, and Tn is a glass transition temperature when a homopolymer is formed of the used monomer.

That is, the right side of the formula is a result obtained by calculating a value (Wn/Tn) by dividing a weight fraction of the used monomer by a glass transition temperature when a homopolymer is formed of the used monomer, and adding the values corresponding to all of the monomers.

3. Evaluation of Tensile Modulus

A tensile modulus of a pressure-sensitive adhesive in the specification was measured through a stress-strain test method according to the method regulated in the ASTM D638, or obtained by measuring a storage modulus by the following method and calculating a value by the following conversion formula when a tensile modulus was difficult to be directly measured. Specifically, a sample having a stacked structure of a PET release film (thickness: 38 μm, MRF-38), a pressure-sensitive adhesive layer and a PET release film (thickness: 38 μm, MRF-38), which was manufactured in Examples or Comparative Examples, was cut into a dog bone-type specimen having a size of 7 cm×1 cm (length×width), both ends of the specimen were fixed with jigs for a tensile test, and a tensile modulus was measured according to the ASTM D638. Such a tensile modulus was measured under the following conditions:

<Conditions for Measuring Tensile Modulus>
Measuring tool: Universal Test Machine (UTM)
Equipment Model: Model: Zwick Roell Z010, Instron
Measuring conditions:
Load cell: 500 N
Tensile speed: 3 mm/sec 4. Method of Evaluating Peeling Strength A peeling strength was evaluated by adhering a pressure-sensitive adhesive, prepared in Examples or Comparative Examples, to a glass washed with ethyl acetate, and peeling the pressure-sensitive adhesive at a room temperature using a texture analyzer (TA) at a peeling angle of 180 degrees and a peeling speed of 0.3 m/min. The peeling strength was measured to the same pressure-sensitive adhesive twice, and an average was recorded.

5. Method of Evaluating Durability and Reliability

A sample was manufactured by washing soda lime glass (1.1 T) with ethyl acetate, and adhering the pressure-sensitive adhesive, prepared in Examples or Comparative Examples, cut to have a size of 130 nm×180 nm (width× length) to the glass. Afterward, the adhered sample was autoclaved at 5 kgf/cm² and 50° C. for approximately 30 minutes to remove bubbles, and then durability was evaluated under the following conditions.

<Heat Resistance and Durability>
Evaluated after stored at 110° C. for 500 hours
<Heat and Moisture Resistance and Durability>
Evaluated after stored at 60° C. and a relative humidity of 90% for 500 hours <Evaluation Criteria>
A: bubbling, peeling, and lifting did not occur
B: bubbling, peeling or little lifting occurred
C: bubbling, peeling or lifting greatly occurred Preparation of Example 1. Preparation of Block Copolymer (A1)

Appropriate amounts of ethyl 2-bromoisobutyrate (EBiB) and methylmethacrylate (MMA) were mixed with ethyl acetate (EAc), a flask containing the mixture was sealed with a rubber membrane, and purged with nitrogen and stirred at 25° C. for approximately 30 minutes to remove dissolved oxygen. Afterward, appropriate amounts of $CuBr_2$, tris(2-pyridylmethyl)amine (TPMA) and tin(II) 2-ethylhexanoate ($Sn(EH)_2$) were added to the mixture from which oxygen was removed, and maintained in a reaction vessel at approximately 67° C., thereby initiating a reaction (polymerization of a first block). A mixture of butyl acrylate (BA) and hydroxyethyl acrylate (HEA) previously bubbled with nitrogen was added at the time when a conversion rate of the methyl methacrylate became approximately 70 to 95% to have a ratio of the final block copolymer as shown in Table 1. Afterward, $CuBr_2$, TPMA and $Sn(EH)_2$ were added to the reaction flask to perform a chain extension reaction (polymerization of a second block). When a conversion rate of the monomer (BA) reaches 80% or more, the reaction mixture was exposed to oxygen, and diluted with a suitable solvent to terminate the reaction, and therefore a block copolymer was prepared.

Preparation of Examples 2 and 3. Preparation of Block Copolymers (B1 and C1)

A block copolymer was prepared by the same method as described in Preparation Example 1, except that weight ratios of monomers of a first block and a second block were controlled as shown in Table 1.

TABLE 1

|  |  | Block copolymer | | |
|---|---|---|---|---|
|  |  | A1 | B1 | C1 |
| First block | MMA ratio | 100 | 100 | 100 |
|  | Tg ( ) | 110 | 110 | 110 |
| Second block | BA ratio | 80 | 80 | 80 |
|  | HEA ratio | 20 | 20 | 10 |
|  | EO2EA ratio |  |  | 10 |
|  | Tg ( ) | −40 | −40 | −45 |
| Block copolymer | Mn (×10000) | 8 | 15 | 8.2 |
|  | PDI | 1.28 | 1.35 | 1.30 |
|  | First block:second block (weight ratio) | 30:70 | 20:80 | 30:70 |

Monomer ratio unit: parts by weight obtained by converting the sum of monomers of respective blocks into 100
MMA: methyl methacrylate (single polymer Tg: approx. 110)
BA: butyl acrylate (single polymer Tg: approx. −45)
HEA: 2-hydroxyethyl acrylate (single polymer Tg: approx. −15)
EO2EA: 2-(2-ethoxyethoxy)ethyl acrylate(single polymer Tg: approx. −70)
Tg: glass transition temperature
Mn: number average molecular weight
PDI: polydispersity index Preparation of Example 4. Preparation of Random Copolymer (D1)

A random copolymer was prepared by adding a monomer mixture including butyl acrylate (BA) and 2-hydroxyethyl acrylate (HEA) in a ratio of 80:20 (BA:HEA) in an 1 L reactor equipped with a cooling device to perform a reflux of a nitrogen gas and facilitate control of a temperature, adding an appropriate amount of n-dodecyl mercaptane at a controlled molecular weight and then ethyl acetate as a solvent, purging nitrogen gas for approximately 60 minutes to remove oxygen, adding azobisisobutyronitrile (AIBN) as an initiator while a temperature was maintained at 60° C., and performing a reaction for approximately 8 hours. A number average molecular weight (Mn) of the prepared random copolymer (B4) was approximately 220,000, and a polydispersity index (PDI) was approximately 5.0.

Example 1 Preparation of Pressure-Sensitive Adhesive Layer

A pressure-sensitive adhesive coating solution was prepared by blending 30 parts by weight of a pentaerythritol triacrylate adduct of isoboron diisocyanate, 0.5 parts by weight of diphenyl(2,4,6-trimethylbenzoyl)phosphine oxide (photoinitiator) and 0.1 parts by weight of a TDI/trimethylolpropane adduct (crosslinking agent) relative to 100 parts by weight of a solid content of the block copolymer (A1) prepared in Preparation Example 1, diluting the mixture with a solvent, and uniformly mixing the diluted result. Subsequently, the prepared pressure-sensitive adhesive composition was coated on a release-treated surface of a poly(ethylene terephthalate) (PET) film (thickness: 38 µm, MRF-38, Mitsubishi) with a silicon compound to have a thickness of 25 µm after drying, and then dried. A pressure-sensitive adhesive layer was formed by further laminating a release-treated surface of the PET film (thickness: 38 µm, MRF-38, Mitsubishi) on the dried coating layer, and being irradiated with UV under the following conditions.
  <Conditions for UV Radiation>
  UV radiator: High-pressure mercury lamp
  Radiation conditions:
  Luminance: 1000 mW/cm$^2$
  Quantity of light: 350 mJ/cm$^2$
  Manufacture of Polarizing Plate A sequence of manufacturing a polarizing plate is as follows. First, a polyvinyl alcohol-based resin film was stretched, stained with iodine, treated with a boric acid aqueous solution, thereby manufacturing a polarizer. Subsequently, a triacetyl cellulose (TAC) film having a thickness of 60 µm was adhered to one surface of the polarizer using a water-based polyvinylalcohol-based adhesive. Subsequently, on the polyvinylalcohol-based polarizer, a water-based polyvinylalcohol-based adhesive composition was coated on a surface to which the TAC film was not adhered to have a thickness after drying of 400 nm. As the water-based polyvinylalcohol-based adhesive composition, an adhesive composition generally used for adhering a TAC protective film to the polarizer was used. Afterward, the manufactured pressure-sensitive adhesive layer was laminated onto the surface on which the adhesive composition was coated, and the adhesive composition was dried, thereby manufacturing a polarizing plate (a polarizing plate structure: TAC film→water-based polyvinylalohol-based adhesive→polarizer water-based polyvinylalcohol-based adhesive→pressure-sensitive adhesive layer PET release film).

Examples 2 and 3 and Comparative Examples 1 and 2

A pressure-sensitive adhesive was prepared by the same method as described in Example 1, except that ratios of components in preparation of a pressure-sensitive adhesive composition were changed as follows.

TABLE 2

|  |  | Example | | | Comparative Example | |
|---|---|---|---|---|---|---|
|  |  | 1 | 2 | 3 | 1 | 2 |
| Polymer | A1 | 100 |  |  |  |  |
|  | B1 |  | 100 |  |  |  |
|  | C1 |  |  | 100 |  |  |
|  | D1 |  |  |  | 100 | 100 |
| MFA1 |  | 30 | 50 |  | 70 | 140 |
| MFA2 |  |  |  | 50 |  |  |
| NCO crosslinking agent |  | 0.1 | 0.1 | 0.1 | 0.1 | 0.1 |
| Radical initiator |  | 0.5 | 0.5 | 0.5 | 0.5 | 0.5 |

Content unit: parts by weight
MFA1: isophorone diisocyanate/pentaerythritol triacrylate adduct
MFA2: pentaerythritol tetraacrylate
NOC crosslinking agent: diphenyl(2,4,6-trimethylbenzoyl)phosphine oxide
Radical initiator: TDI/trimethylolpropane adduct Results of evaluating physical properties measured with respect to Examples and Comparative Examples are summarized and listed in Table 3.

TABLE 3

|  | Example | | | Comparative Example | |
|---|---|---|---|---|---|
|  | 1 | 2 | 3 | 1 | 2 |
| Elastic modulus (MPa) | 150 | 170 | 200 | 110 | 220 |
| Pressure-sensitive adhesive strength (gf) | 385 | 290 | 210 | 60 | 12 |
| Heat resistance and durability | A | A | A | C | C |
| Moisture and heat resistance and durability | A | A | A | B | C |

DESCRIPTION OF THE MARKS IN THE DRAWINGS 100, 200, 300: the polarizing plate
1021, 1022: the polarizer protective film
101: the polarizer
103, 201: the pressure sensitive adhesive layer
104: the releasing film
301: the adhesive layer

What is claimed is:
1. A polarizing plate, comprising:
a polarizer; and
a pressure-sensitive adhesive layer that is on one surface of the polarizer and that comprises a pressure-sensitive adhesive composition,
the pressure-sensitive adhesive composition comprising:
a block copolymer that comprises a first block, of which a glass transition temperature is 50° C. or more, and a second block, of which a glass transition temperature is −30° C. or less; a multifunctional crosslinking agent capable of forming a crosslinking structure via a reaction with the block copolymer; and a multifunctional acrylate, and
the pressure-sensitive adhesive composition forming an interpenetrating polymer network after curing, wherein the block copolymer has a number average molecular weight in a range from 20,000 to 500,000 and a polydispersity index in a range from 1.0 to 3.5, and wherein a tensile modulus of the pressure sensitive adhesive composition is from 0.5 to 1,000 MPa at 25° C. after the interpenetrating polymer network is formed.

2. The polarizing plate according to claim 1, further comprising a polarizer protective film formed on only one surface of the polarizer, and the pressure-sensitive adhesive layer being formed on a surface of the polarizer, on which the protective film is not formed.

3. The polarizing plate according to claim 1, further comprising an adhesive layer between the pressure-sensitive adhesive layer and the polarizer.

4. A pressure-sensitive adhesive composition for an optical film, that forms an interpenetrating polymer network structure after being cured, and that comprises:

a block copolymer comprising a first block, of which a glass transition temperature is 50° C. or more, and a second block, of which a glass transition temperature is −30° C. or less;

a multifunctional crosslinking agent capable of forming a crosslinking structure via a reaction with the copolymer; and a multifunctional acrylate, wherein the block copolymer has a number average molecular weight in a range from 20,000 to 500,000 and a polydispersity index in a range from 1.0 to 3.5, and wherein a tensile modulus of the pressure sensitive adhesive composition is from 0.5 to 1,000 MPa at 25° C. after the interpenetrating polymer network is formed.

5. The pressure sensitive adhesive composition according to claim 4, wherein the block copolymer comprises a crosslinkable functional group in the second block.

6. The pressure sensitive adhesive composition according to claim 4, wherein the block copolymer is a diblock copolymer comprising a first block and a second block, or a triblock copolymer comprising a first block, a second block and a third block.

7. The pressure sensitive adhesive composition according to claim 4, wherein the first block comprises a methacrylic acid ester monomer.

8. The pressure sensitive adhesive composition according to claim 4, wherein the second block comprises an acrylic acid ester monomer.

9. The pressure sensitive adhesive composition according to claim 8, wherein the second block further comprises a copolymerizable monomer having a crosslinkable functional group.

10. The pressure sensitive adhesive composition according to claim 4, wherein the block copolymer comprises 25 to 1900 parts by weight of the second block relative to 100 parts by weight of the first block.

11. The pressure sensitive adhesive composition according to claim 4, which comprises the multifunctional crosslinking agent in an amount from 0.01 to 10 parts by weight relative to 100 parts by weight of the block copolymer.

12. The pressure sensitive adhesive composition according to claim 4, wherein the multifunctional acrylate has a molecular weight of 10,000 g/mol or less.

13. The pressure sensitive adhesive composition according to claim 4, which comprises the multifunctional acrylate in an amount from 5 to 300 parts by weight relative to 100 parts by weight of the block copolymer.

14. The pressure sensitive adhesive composition according to claim 4, further comprising: a radical initiator in an amount from 0.01 to 10 parts by weight relative to 100 parts by weight of the block copolymer.

15. The pressure sensitive adhesive composition according to claim 4, further comprising: a silane coupling agent having an acetoacetate group or a beta-cyanoacetyl group.

16. A display device, comprising a liquid crystal panel on one or both surfaces of which the polarizing plate of claim 1 is adhered.

* * * * *